No. 761,577. PATENTED MAY 31, 1904.
F. O. BULLIS.
COASTER BRAKE.
APPLICATION FILED MAR. 11, 1901.
NO MODEL.
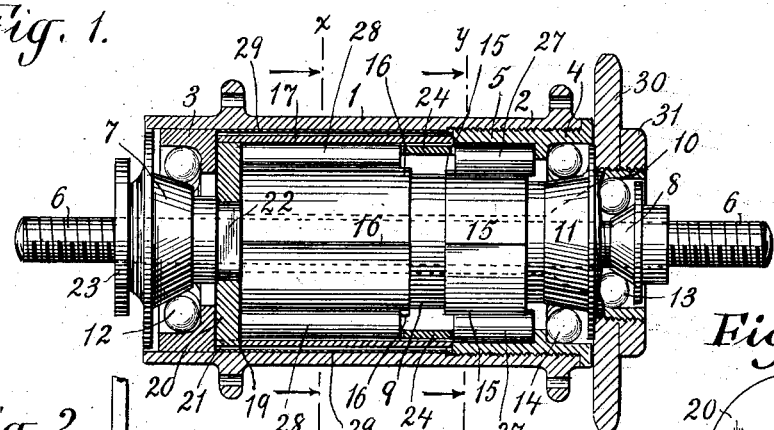
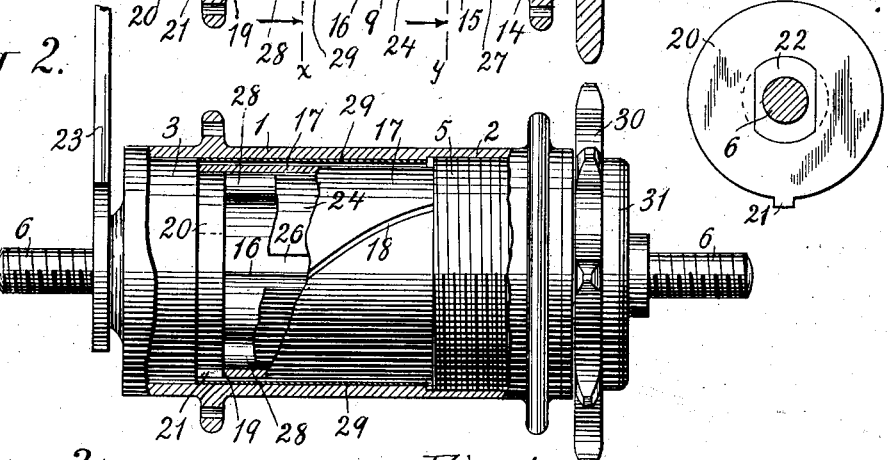
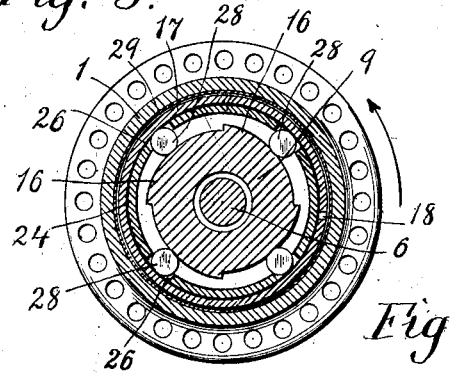
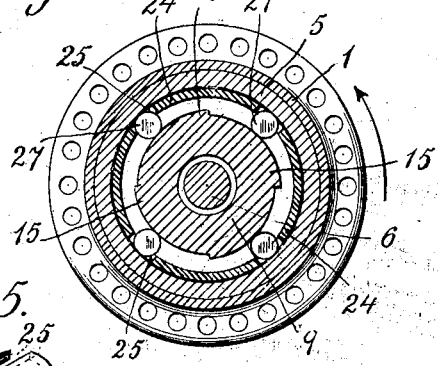
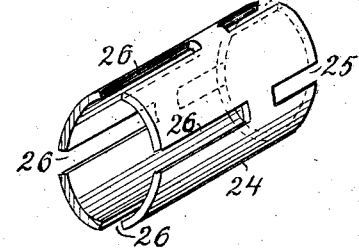
WITNESSES:
D. N. Rayford
Vm. N. Shaw
INVENTOR
Frederick O. Bullis.
BY
Daniel A. Carpenter,
ATTORNEY No. 761,577. Patented May 31, 1904.

UNITED STATES PATENT OFFICE.

FREDERICK O. BULLIS, OF ROCHESTER, NEW YORK.

COASTER-BRAKE.

SPECIFICATION forming part of Letters Patent No. 761,577, dated May 31, 1904.

Application filed March 11, 1901. Serial No. 50,612. (No model.)

*To all whom it may concern:*

Be it known that I, FREDERICK O. BULLIS, a citizen of the United States, and a resident of Rochester, in the county of Monroe and State of New York, have invented a certain new and useful Improvement in Coaster-Brakes, of which the following is a full, clear, and exact description, reference being made to the accompanying drawings, forming part of this specification.

This invention relates to improvements in mechanism which is partly composed of a coaster-brake that is inclosed in and acts on an internal surface of a hub of a wheel; and the invention consists of the combination, with a hub of a wheel, of the mechanism which is hereinafter described and claimed.

On the accompanying sheet of drawings, Figure 1 is a rear sectional elevation of the hub of a bicycle-wheel and the mechanism contained therein; Fig. 2, another sectional view thereof, certain parts being broken to expose others surrounded by them; Fig. 3, a cross-section on the plane $x\ x$, Fig. 1, viewed in the direction indicated by the arrows; Fig. 4, a cross-section on the plane $y\ y$, Fig. 1, viewed in the direction indicated by the arrows; Fig. 5, a perspective of a roller-retaining device; and Fig. 6, a face view of a connecting-plate, of which sectional and edge views are shown in Figs. 1 and 2.

Similar reference-numerals designate like parts in different views.

The object of this invention is to simplify and otherwise improve the construction of coaster-brakes which comprise a fixed expansible tube which is confined in the hub between its bearings and which is expanded by the action of cams and rollers to produce friction on the surrounding interior surface of the hub. The cams and rollers are operated by means of a hollow shaft which loosely surrounds the axle and to which driving mechanism is connected by either a sprocket-ring secured on the shaft, as shown, or a bevel-pinion or some other suitable shaft-turning device.

The hub 1 has next to one end an internally-screw-threaded section 2 and contains near its other end a ball-cup 3. A bushing composed of the ball-cup 4 and the cylindrical section 5 fits in the section 2 of the hub. The axle 6 carries cones 7 and 8, and in the outer end of the hollow shaft 9 is a ball-cup 10, and on this shaft is a cone 11, rings of balls 12, 13, and 14 being confined in the cups 3, 10, and 4, surrounding the cones 7, 8, and 11, respectively. The hollow shaft has formed on it two sets of cams 15 and 16, arranged to act in opposite directions, the cams 15 acting when the shaft is turned forward and the cams 16 when it is turned backward. The cylindrical section 5 of the bushing surrounds the cams 15, and the cams 16 are surrounded by a steel tube 17, whose inner and outer surfaces are both cylindrical and which is rendered expansible by a slit 18, that crosses a straight line drawn on the tube parallel to its axis, the slit being either curved or composed of straight sections making an angle or angles with one another. The interior diameter of this tube when it is not expanded is substantially equal to that of the section 5 of the bushing, and in that end of the tube which is next to the ball-cup 3 is a notch 19. The connecting-plate 20 fits in the tube 17, the projection 21 of this plate extending into the notch 19 in the tube, and the plate is secured, as appears by Figs. 1 and 6, on an extension 22 of the cone 7. A bar 23, attached to the cone and to the frame, prevents the cone-plate 20 and tube 17 from turning.

The roller-retaining device (shown alone in Fig. 5) is a tube 24 containing slots 25 and 26. It fits loosely in the section 5 of the bushing and in the tube 17 and surrounds the hollow shaft and cams. It retains the rollers 27 and 28 in their proper positions on and between the cams 15 and 16, respectively, and between the hollow shaft and the bushing and tube 17, respectively, the rollers 27 being in the slots 25 and the rollers 28 in the slots 26. The distance from the outermost parts of the cams 15 to the surrounding bushing is less than the diameter of the rollers 27, and the distance from the outermost parts of the cams 16 to the surrounding tube 17 is less than the diameter of the rollers 28, while the distance from the surface of the shaft between the cams 15 to the bushing is greater than the diameter of the rollers 27 and the distance from the surface of the shaft between the cams 16 to the tube 17 is greater than the diameter of the rollers 28. The parts of the surface of the shaft between the cams 15 and those between the cams 16 are sections of a cylindrical surface whose axis coincides with those of the bushing and the tube 17. The arrangement of the two sets of cams with respect to each other being as shown and each of the slots 25 of the device 24 being in alinement with one of the slots 26, the rollers 27 and 28 are held close to the heels of the cams 15 and 16, respectively, when both sets of cams are inactive, the rollers of each set then being in proper positions to be promptly actuated. Obviously the rollers would be held in similar positions with respect to the cams if the longer and shorter slots of the retaining device were out of alinement and the arrangement of the cams were complemental to that of the slots.

A tube 29 surrounds the steel tube 17. It is made of resilient material, preferably such as vulcanized or indurated fiber, and is slit from end to end to render it expansible and is not fastened to any other device, it being less liable to squeak than is a similar tube fastened to the tube 17, for example. The sprocket-ring 30 and nut 31 are screwed on the cup 10, the sprocket being clamped between the head of the cone 11 and the nut.

The wheel is free when the cams and rollers are in the relative positions in which they appear in Figs. 3 and 4. It runs then on the balls 12 and 14. When it is driven forward by power applied to the sprocket-ring, motion is imparted to it from the shaft 9 acting on the hub through the cams 15 and the rollers 27. These rollers are forced tightly between the cams 15 and the surrounding bushing, and the shaft 9, cams, rollers, roller-retaining device, hub, and balls 14 all rotate together on the balls 12 and 13. As the cams 15 engage the rollers 27 the cams 16 move forward away from the rollers 28, which are held in alinement with the rollers 27 by the device 24, and the rollers 28 are thereafter loosely retained next to the cylindrical sections of the surface of the shaft between the cams 16 so long as the rollers 27 are held fast by the cams 15 and the bushing. The wheel is rendered free again with a slight backward movement of the sprocket-ring, whereupon the cams 15 recede from the rollers 27 and the cams 16 return toward the rollers 28 until the cams and rollers are restored to the relative positions with respect to one another and to the bushing and tube 17 in which they are shown in Figs. 3 and 4.

The brake is actuated with a further backward movement of the sprocket-ring. The cams 16 as they are driven backward against the rollers 28 push these rollers outward, and the tube 17 is expanded by the action of the rollers upon it, and the fibrous tube 29 is pressed by the tube 17 firmly against the surrounding surface of the hub, the wheel running on the balls 12 and 14 and the shaft 9 bearing on the balls 13 and rollers 28 and turning backward in the ring of balls 14. The rollers 27 being kept in alinement with the rollers 28 by the retaining device, the cams 15 recede from the rollers 27, which are loosely retained next to the cylindrical sections of the surface of the shaft 9 between the cams 15. The inner end of the shaft 9 being movable slightly in directions transverse to the axis of the axle, inasmuch as its bearings are both close to its outer end, the cams 16 act with the same force on all the rollers 28 at the same time. The tube 29 of fibrous material helps to render the action of the brake quite smooth and almost noiseless; but obviously it would be possible to dispense with this tube and allow the tube 17 to act directly on the hub. The slot 18 in the tube 17 is made either curved or angular, as above described, to prevent the rollers 28 from catching in it, as they would be apt to do if the slot were parallel throughout its length with the axes of the rollers.

The bushing 4 5, shaft 9, with the sprocket-ring secured on it, rollers, roller-retaining device, tube 17, and connecting-plate 20 are put together before they are applied to the hub. When the bushing has been screwed into the hub, the balls 14 are inserted in the cup 4. Then the axle 6, having on it the cone 7, is pushed through the hub and shaft 9. Then the balls 12 are inserted in the cup 3. Then the extension 22 of the cone 7 is engaged with the plate 20. Then the balls 13 are inserted in the cup 10, and finally the cone 8 is screwed on the axle.

The three bearings are adjusted simultaneously by turning the cone 8 only.

Having thus described my invention, what I claim as new, and desire to secure by Letters Patent, is—

1. The combination with a hub of a wheel of mechanism comprising: a hollow shaft extending into the hub; an axle extending through the hub and said shaft; a fixed expansible tube surrounding said shaft; cams and rollers that coact with said shaft in expanding this tube, the rollers being within the tube and between it and said shaft; a roller-retaining device within said tube to keep the rollers at constant distances apart; and a clutch comprising means to lock said shaft and the hub and the roller-retaining device together with the forward motion of said shaft; substantially as described.

2. The combination with the hub of a wheel of mechanism comprising: a hollow shaft extending into the hub, and having on it a set of cams arranged to act with a backward movement of the shaft; an axle extending through the hub and said shaft; a fixed expansible tube surrounding said shaft, both the outer and inner surfaces of said tube being cylindrical; a set of rollers on which the cams act, the rollers being within the tube and between it and said shaft; a roller-retaining device within said tube to keep the rollers at constant distances apart; and a clutch comprising means to lock said shaft and the hub and the roller-retaining device together with the forward motion of said shaft; substantially as described.

3. The combination with a hub of a wheel of mechanism comprising: a hollow shaft extending into the hub; an axle on which the hub and said shaft are mounted; means for imparting forward motion only to the hub from said shaft; a fixed expansible tube contained in the hub and surrounding said shaft; cams and rollers that coact with said shaft in expanding this tube; and an expansible and resilient tube surrounding the fixed expansible tube, and being unattached to said fixed tube or the hub to render it capable of either moving with the hub or clinging to the fixed tube; substantially as described.

4. The combination with a hub of a wheel of mechanism comprising: a hollow shaft extending into the hub; an axle on which the hub and said shaft are mounted; cams and rollers that coact with said shaft in imparting forward motion only to the hub; a fixed expansible tube contained in the hub and surrounding said shaft; other cams and rollers that coact with said shaft and expansible tube in exerting pressure on the interior surface of the hub; and a roller-retaining device having two sets of spaces in which the two sets of rollers are confined; substantially as described.

5. The combination with a hub of a wheel of mechanism comprising: a hollow shaft extending into the hub; an axle on which the hub and said shaft are mounted; a set of driving-cams on said shaft; a set of rollers on which these cams act and which coact with the cams in turning the hub forward; a set of brake-cams on said shaft, arranged to act with a backward movement of the shaft; another set of rollers on which the brake-cams act; a fixed expansible tube which surrounds the latter rollers and with which these rollers and the brake-cams coact in exerting pressure on the interior surface of the hub; and a roller-retaining device consisting of a tube having in it two sets of slots in which the two sets of rollers are confined; substantially as described.

FREDERICK O. BULLIS.

In presence of—
HENRY S. DURAND,
CARRIE BAER.